United States Patent [19]
Vilain et al.

[11] Patent Number: 4,550,932
[45] Date of Patent: Nov. 5, 1985

[54] DEVICE FOR TRANSVERSELY MAINTAINING AN ANTI-ROLL BAR

[75] Inventors: Claude Vilain, Montbeliard; Gapp Noël, Dorans, both of France

[73] Assignees: Societe Anonyme Automobiles Peugeot, Paris; Societe Anonyme Automobiles Citroen, Neuilly-sur-Seine, both of France

[21] Appl. No.: 534,277

[22] Filed: Sep. 21, 1983

[30] Foreign Application Priority Data

Sep. 23, 1982 [FR] France ................. 82 16041

[51] Int. Cl.$^4$ ............................ B60G 21/00
[52] U.S. Cl. ..................... 280/689; 267/57; 280/665; 280/700; 403/396
[58] Field of Search ............ 280/95 R, 665, 664, 280/689, 690, 695, 700, 721, 723; 267/57; 292/305; 403/177, 393, 396

[56] References Cited

U.S. PATENT DOCUMENTS

| | | | |
|---|---|---|---|
| 2,043,542 | 6/1936 | Johnson | 180/73.5 |
| 2,465,098 | 3/1949 | Inskeep | 280/723 |
| 2,542,363 | 2/1951 | Sarnac | 280/723 |
| 2,728,569 | 12/1955 | Schlegel | 267/19 R |
| 3,116,071 | 12/1963 | Wilfert et al. | 280/723 |
| 3,175,842 | 3/1965 | Rogers | 280/723 |
| 3,325,227 | 6/1967 | Hunter | 403/396 |
| 3,342,505 | 9/1967 | Diehl | 280/43.18 |
| 4,133,554 | 1/1979 | Lampert | 280/689 |

FOREIGN PATENT DOCUMENTS 8012412 5/1980 Fed. Rep. of Germany .
2486461 1/1982 France .

Primary Examiner—Joseph F. Peters, Jr.
Assistant Examiner—Kenneth R. Rice
Attorney, Agent, or Firm—Burns, Doane, Swecker & Mathis

[57] ABSTRACT

The anti-roll bar 7 supported by two bearings 9 and connected at each of its ends to a suspension lever 4, is maintained in its axial direction by at least one tie 10. The latter is resiliently deformable in torsion and secured to the bar at 11 and to the structure of the vehicle at 12. This immobilization of the bar is achieved by cheap devices which introduce no friction producing noise or wear. Application in motor vehicles.

15 Claims, 3 Drawing Figures

DEVICE FOR TRANSVERSELY MAINTAINING AN ANTI-ROLL BAR

The invention relates to sets of wheels of a motor vehicle whose suspension comprises an anti-roll torsion bar including, on one hand, a central portion disposed transversely of the vehicle and supported in two bearings and, on the other hand, two end portions which are oriented obliqueiy forwardly or rearwardly in a roughly horizontal plane and are respectively connected to a suspension element which is vertically movable with the respective one of the two wheels.

In many cases, said end oblique portion of the bar participates in the longitudinal and transverse maintenance of the support of the corresponding wheel, in particular when this support is a telescopic leg whose lower end is pivotally connected to a horizontal lever constituting said vertically movable suspension element; the bar is then subjected not only to the usual torsional stresses but also to notable longitudinal and transverse forces.

The longitudinal forces are transmitted to the aforementioned bearings and the transverse forces tend to cause the bar to slide in these bearings.

In order to prevent this sliding which would result in slight inopportune displacements of the wheel supports and consequently in a lack of precision in the manner in which the vehicle rolls along the road, means for transversely maintaining the bar are advantageously provided. These means usually comprise abutment elements connected to the bar and bearing axially against one or each of the bearings. But as the bar is rotatable, this axial bearing is accompanied by friction which produces noise and wear of the contacting parts, which wear eventually produces an axial clearance or play which allows said sliding of the bar and the inopportune displacements of the wheel supports.

An object of the invention is to provide, by simple means, a device for transversely maintaining the anti-roll bar which avoids the aforementioned drawbacks, i.e. which is neither noisy nor subject to wear.

The invention provides a device for maintaining a transverse anti-roll bar carried by two bearings fixed on the structure of a vehicle, which device comprises at least one tie oriented roughly transversely and resiliently deformable in torsion and having a first end portion which is secured to the bar and a second end portion which is secured to said structure.

According to other advantageous features:

the tie is a rod of resiliently yieldable metal;

the tie is secured to the central part of the bar between the two bearings;

the first end portion of the tie is rectilinear and clamped against the bar by a screw which extends through the central portion of a U-shaped collar having two branches which are provided with an aperture through which the bar and the tie extend;

the bar being a rod, its second end portion forms a loop through which extends a bolt which clamps it against the structure of the vehicle.

One embodiment of a device according to the invention will be described hereinafter with reference to the accompanying drawings in which.

Figure 1:
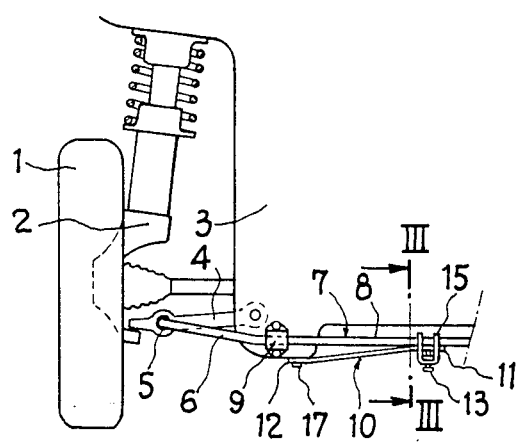
FIG. 1 is a simplified front elevational view of one half of a set of vehicle wheels, the other half being symmetrical relative to the median longitudinal plane of the vehicle.

FIG. 1 shows a wheel 1 carried by a telescopic leg structure 2 the lower part of which is connected to the structure 3 of a vehicle by a roughly horizontal lever 4 which is capable of pivoting vertically. Connected to this lever by a pivotal connection 5 is one of the two end portions 6 of an anti-roll torsion bar 7 whose central portion 8 is disposed transversely relative to the longitudinal direction of the vehicle and is carried at each of its ends by a bearing 9 fixed to the structure 3. Each end portion 6 is obliquely oriented forwardly or rearwardly of the vehicle in a roughly horizontal plane and constitutes with the corresponding lever 4 a roughly horizontal pivotal triangular structure.

A transverse rod 10 made from a metal having good characteristics of resilience, is fastened at one end 11 to the central portion 8 of the bar and fixed at its other end 12 to the structure 3. For this purpose, the end portion 11 is rectilinear and clamped against a generatrix of the bar by a bolt 13 which cooperates with a nut 14 rigid with the central portion of a U-shaped collar 15 whose branches have apertures 16 through which the bar 7 and the rod 10 extend.

Figure 2:
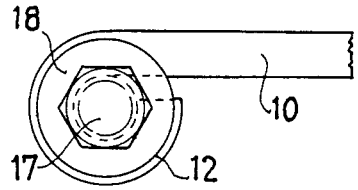
FIG. 2 is a top plan view of a detail of FIG. 1.

The end portion 12 (FIG. 2) is bent in the shape of a loop and a bolt 17 extends through this loop and clamps it against the structure 3 with interposition of a washer 18.

Figure 3:
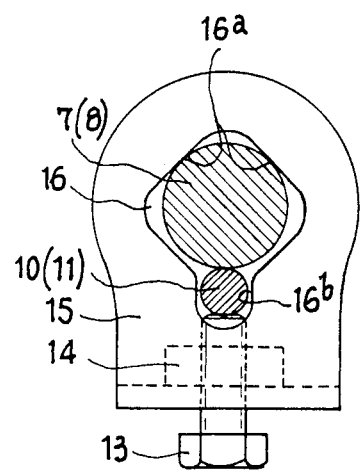
FIG. 3 is a left sectional view taken along line III—III of FIG. 1.

FIG. 3 shows in detail one embodiment of the collar 15 in which each aperture 16 has a contour surrounding the bar 7 and the rod 10 with clearance, the bar 7 and the rod 10 being in superimposed relation above the bolt 13. This contour has a V-shape (at 16a) on the side opposed to the bolt 13 so as to provide a stable support for one of the two bearing elements, namely the bar 7 or the rod 10. In the illustrated arrangement, it is the bar 7 which bears against the V-shaped side of the aperture, the rod 10 being received in a U-shaped recess 16b and interposed between the bar and the bolt. By way of a modification, the bar may be interposed between the bolt and the rod, the latter then bearing against the V of a suitable aperture.

When the wheel 1 moves vertically, the triangle formed by the lever 4 and by the corresponding end portion 6 pivots vertically and the central portion 8 of the anti-roll bar turns slightly in its bearings 9 and brings about a small rotation of the end portion 11 of the rod 10. The end portion 12 of the latter is fixed by means of the bolt 17 and the rod twists and slightly bends without reaching its elastic yield limit.

When the wheel 1 and the triangular structure 4, 7 are subjected to longitudinal and transverse forces, the bar 7 tends to slide in the bearing 9, but is prevented from doing so by the rod 10 which is subjected to tensile or compressive stress, depending on the direction of the forces in the transverse direction of the vehicle. The rod therefore behaves in the manner of a transverse tie which axially immobilizes the bar 7 and thus ensures a good transverse maintenance of the lower end of the suspension leg structure 2 and consequently results in a correct roll stability of the vehicle. Further, this immobilization of the bar is achieved by cheap means which introduce no friction producing noise or wear.

Having now described our invention what we claim as new and desire to secure by Letters Patent is:

1. A device for maintaining a transverse anti-roll bar for a vehicle having a body structure, wheels and a suspension for the wheels which includes a transverse anti-roll bar, said device comprising two bearings for securing said roll bar to said structure of a vehicle, at least one tie for orienting roughly transversely of the vehicle, said tie being resiliently deformable in torsion and having a first end portion and a second end portion, means for securing the first end portion to the bar and means for securing the second end portion to said structure.

2. A device according to claim 1, wherein the tie is a rod of resilient metal.

3. A device according to claim 1, wherein the tie is secured to a central portion of the bar between the two bearings.

4. A device according to claim 1, wherein the first end portion of the tie is straight and the means for securing the first end portion to the bar comprise a clamping bolt and a U-shaped collar having a central portion and branches each of which are provided with an aperture through which aperture the bar and the tie extend, the bolt extending through the central portion of the U-shaped collar.

5. A device according to claim 2, wherein the first end portion of the tie is straight and the means for securing the first end portion to the bar comprise a clamping bolt and a U-shaped collar having a central portion and branches each of which are provided with an aperture through which aperture the bar and the tie extend, the bolt extending through the central portion of the U-shaped collar.

6. A device according to claim 3, wherein the first end portion of the tie is straight and the means for securing the first end portion to the bar comprise a clamping bolt and a U-shaped collar having a central portion and branches each of which are provided with an aperture through which aperture the bar and the tie extend, the bolt extending through the central portion of the U-shaped collar.

7. A device according to claim 4, wherein each branch of the collar has a V-shaped bearing surface for the respective rod and tie.

8. A device according to claim 1, wherein the tie is a rod and said second end portion forms a loop through which extends a bolt which clamps the loop against said structure.

9. A device according to claim 2, wherein the tie is a rod and said second end portion forms a loop through Which extends a bolt which clamps the loop against said structure.

10. A device according to claim 3, wherein the tie is a rod and said second end portion forms a loop through which extends a bolt which clamps the loop against said structure.

11. A device according to claim 4, wherein the tie is a rod and said second end portion forms a loop through which extends a bolt which clamps the loop against said structure.

12. A device according to claim 5, wherein the tie is a rod and said second end portion forms a loop through which extends a bolt which clamps the loop against said structure.

13. A device according to claim 6, wherein the tie is a rod and said second end portion forms a loop through which extends a bolt which clamps the loop against said structure.

14. A device according to claim 7, wherein the tie is a rod and said second end portion forms a loop through which extends a bolt which clamps the loop against said structure.

15. A motor vehicle comprising a body structure, a set of wheels, a suspension system for the set of wheels including an anti-roll torsion bar having a central portion disposed transversely of the vehicle, being supported in two bearings carried by said body structure, having two end portions oriented obliquely in a roughly horizontal plane and respectively connected to a suspension element of said suspension system, said suspension element being vertically movable with a respective one of the set of wheels, including a maintaining device for the anti-roll torsion bar, said maintaining device comprising at least one tie oriented roughly transversely of the vehicle, said tie being resiliently deformable in torsion and having a first end portion and a second end portion, means for securing the first end portion of the tie to the bar, and means for securing the second end portion of the tie to said structure.

* * * * *